(12) United States Patent
Dal Monte

(10) Patent No.: US 10,524,528 B2
(45) Date of Patent: Jan. 7, 2020

(54) SYSTEM FOR SUPPORTING THE HEAD-HELMET UNIT OF A PASSENGER INSIDE A VEHICLE

(71) Applicant: B.M.A. Buizza Mazzei Agency S.r.l., Rome (IT)

(72) Inventor: Antonio Dal Monte, Rome (IT)

(73) Assignee: B.M.A. Buizza Mazzei Agency S.r.l., Rome (IT)

(*) Notice: Subject to any disclaimer, the term of this patent is extended or adjusted under 35 U.S.C. 154(b) by 255 days.

(21) Appl. No.: 15/573,656

(22) PCT Filed: May 13, 2016

(86) PCT No.: PCT/IB2016/052768
§ 371 (c)(1),
(2) Date: Nov. 13, 2017

(87) PCT Pub. No.: WO2016/181354
PCT Pub. Date: Nov. 17, 2016

(65) Prior Publication Data
US 2018/0140035 A1    May 24, 2018

(30) Foreign Application Priority Data
May 14, 2015  (IT) .................. 102015902351682

(51) Int. Cl.
*A42B 3/00*  (2006.01)
*A42B 3/04*  (2006.01)
*A41D 13/05*  (2006.01)

(52) U.S. Cl.
CPC ........ *A42B 3/0473* (2013.01); *A41D 13/0512* (2013.01)

(58) Field of Classification Search
CPC .......................... A42B 3/0473; A41D 13/0512
See application file for complete search history.

(56) References Cited

U.S. PATENT DOCUMENTS

| | | | | |
|---|---|---|---|---|
| 4,711,411 A * | 12/1987 | Copp | ................... | B64D 25/00 244/1 R |
| 4,909,459 A * | 3/1990 | Patterson | ............. | A42B 3/0473 2/410 |
| 4,923,147 A * | 5/1990 | Adams | ................. | A42B 3/0473 244/122 AG |
| 4,954,815 A * | 9/1990 | Delmonte | ........... | A63B 23/025 128/866 |
| 5,267,708 A * | 12/1993 | Monson | ................. | B64D 25/02 244/121 |
| 5,272,422 A * | 12/1993 | Beaussant | ............ | A42B 3/0473 2/6.2 |
| 6,428,043 B1 * | 8/2002 | Wooten | ................... | B60R 21/02 180/271 |
| 6,751,809 B1 * | 6/2004 | Cooper | ................ | A42B 3/0473 2/421 |

(Continued)

*Primary Examiner* — Richale L Quinn
(74) *Attorney, Agent, or Firm* — Abelman, Frayne & Schwab

(57) ABSTRACT

A system for lifting the head of an individual in a vehicle who is wearing a helmet, the system comprising suspension means for suspending the helmet and adjustment means for balancing the head of the individual as a function of the center of mass of the head of the individual, of the helmet and of any further equipment.

9 Claims, 6 Drawing Sheets

(56) References Cited

U.S. PATENT DOCUMENTS

| | | | | |
|---|---|---|---|---|
| 7,155,747 B2 * | 1/2007 | Baker | ................. | A42B 3/0473 2/421 |
| 7,941,873 B2 * | 5/2011 | Nagely | ............... | A42B 3/0473 2/425 |
| 8,046,846 B2 * | 11/2011 | Karlsson | .............. | A42B 3/0473 2/410 |
| 8,814,266 B2 * | 8/2014 | Guering | ................ | B64D 11/06 297/216.12 |
| 9,265,296 B2 * | 2/2016 | Dal Monte | ......... | A42B 3/0473 |
| 2004/0194194 A1 * | 10/2004 | McNeil | ............... | A42B 3/0473 2/421 |
| 2004/0255368 A1 * | 12/2004 | Baker | ................. | A42B 3/0473 2/410 |
| 2013/0125296 A1 * | 5/2013 | Rabinovitch | ......... | A42B 3/046 2/413 |

* cited by examiner

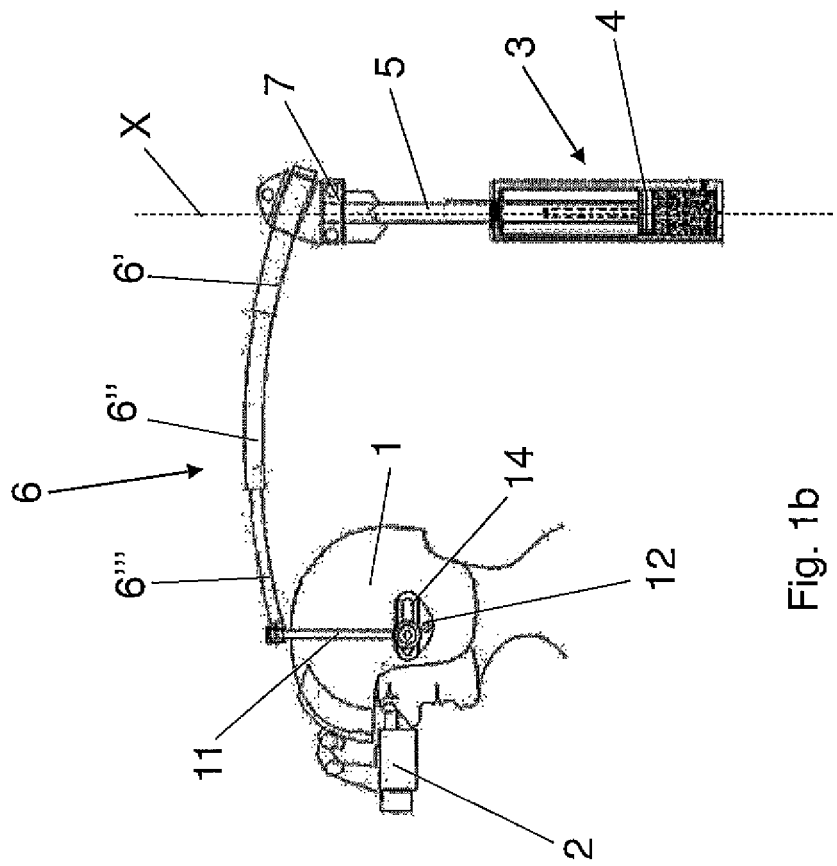
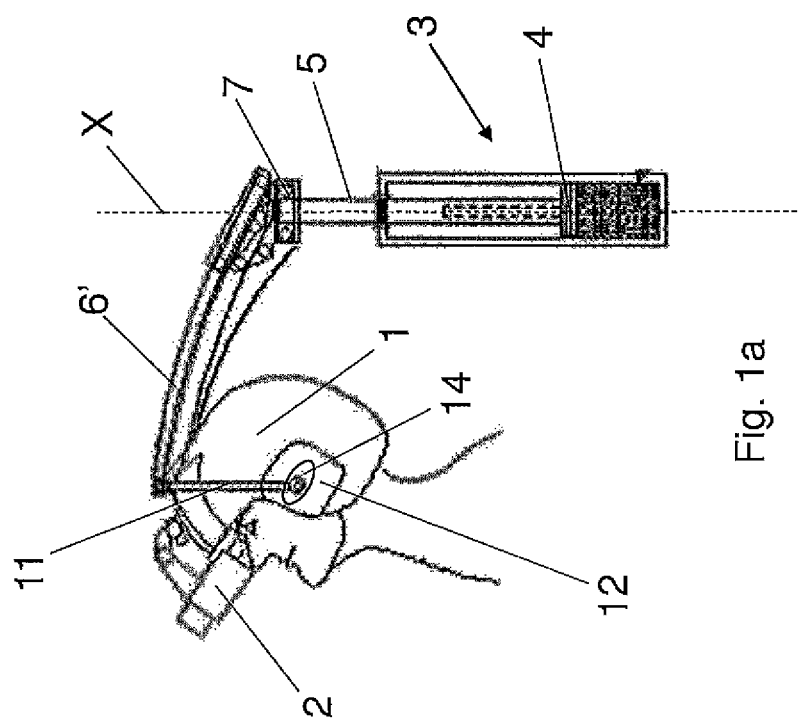
Fig. 1a
Fig. 1b

SYSTEM FOR SUPPORTING THE HEAD-HELMET UNIT OF A PASSENGER INSIDE A VEHICLE

CROSS-REFERENCE TO RELATED APPLICATION

This application claims benefit under 35 U.S.C. § 371 to international application No. PCT/IB2016/052768, filed on May 13, 2016, which claims priority to Italian application no. 102015902351682, filed May 14, 2015, the contents of which are incorporated by reference in their entireties.

FIELD OF THE INVENTION

The present invention relates to a system for supporting the head-helmet unit of a passenger of a vehicle, in particular of a pilot of a helicopter, of an airplane or of armored vehicles such as a tank. More specifically, such a system supports the head of a pilot wearing a helmet provided possibly with night vision goggles and related battery pack.

BACKGROUND ART

The arrangement of the head, neck and shoulder muscles make the task of maintaining the balancing of the head on the neck burdensome due to the highly reduced arm with respect to the fulcrum of the head suspension system. This is due to the fact that the cervical vertebrae are a structure similar to overhanging beams which has to be self-supporting, which implies that no other osteo-muscular component of the body helps to support the load of the head-neck system in vertical, lateral, oblique and sagittal direction. Thus, the working load required to maintain the head balanced in a position in which sight is horizontal is particularly burdensome. Indeed, the human body employs about twenty muscles between the right and left side of the neck to prevent the head from falling downwards. Such muscles in the side-rear area of the neck serve to contribute to generating the muscular contraction to maintain the head in horizontal position. Such muscles are obligated to develop an isometric force of 25-35 kg to maintain the head in horizontal position, otherwise the head would tend to move, typically downwards. Various cervical pathologies are detected in subjects employed in works forcing them to keep their head fixed in certain positions for an increased number of hours a day. The subjects most at risk are video terminal operators, radar operators, musicians, drivers of heavy vehicles and in particular individuals who drive military means, especially because they are also forced to wear heavy safety helmets. In particular, the damage to the cervical vertebrae of helicopter pilots depends mainly:
- on the weight of the helmets, and on the related safety goggles, worn by military pilots and their crew, which make the situation worse due to the additional load applied to the head-neck system;
- on the further weight of night vision goggles, which are increasingly often also used in military operations, which is combined with the fatigue of the neck musculature due to a continuous rotation of the head required by the limited angle of vision of the night vision goggles themselves;
- on the increased level of vibrations, affecting also the most sophisticated and modern helicopters, which is capable of generating severe stress on the entire spine, a stress which intensifies precisely at the cervical level.

The painful contractures and pathologies of the neck musculature are more frequent in helicopter pilots who mainly operate when there is poor lighting, because they wear heavy night vision goggles. It is known that to improve the muscular balancing system of the head, it has been experimented to reduce the force of contraction generated by the neck muscles by applying a counter-balancing weight to the occipital region, e.g. of 300-500 grams, against about 25-35 kg of effort required by the muscles to keep the head in the horizontal position. In particular, it has been found that, when a motorcycle helmet is used, about 700 grams of counter-balancing weight are needed to reduce the effort of the driver and accordingly increase the comfort conditions. Moreover, as mentioned above, when there is an additional need, for example, for night vision goggles in addition to the helmet, which in themselves are heavy and protrude with respect to the front part of the head, there is an additional stress requiring more adequate solutions, while also taking into account the fact that there is a need for the pilot and other crew members—especially in a combat helicopter—to have complete freedom of movement of at least the head-neck-upper part of the chest system. The known solutions do not succeed in adequately resolving the problem of the tendency of the head to move, in particular downwards.

Moreover, it would be advantageous to be able to adjust the balancing of the loads, in particular as a function of the position of the center of mass of the head-helmet system. A further need is to allow adjustments based on individual physical characteristics, such as the head conformation, or based on the comfort conditions specific for each pilot.

SUMMARY OF THE INVENTION

It is an object of the present invention to provide a system for supporting the head of a passenger of a vehicle, in particular of a helicopter, of an airplane or of armored vehicles such as a tank, said system being adapted to significantly decrease the effort of the cervical muscles to jointly support and balance the neck, head and further equipment which becomes required under certain operating conditions, such as for example a helmet and any night vision goggles.

It is a further object of the present invention to provide such a system which also allows adjusting the balancing of the loads, while providing the possibility of moving the center of mass of the head-helmet system based on the actual weight and the weight distribution, of the helmet and of any additional equipment, such as for example night vision goggles, and/or based on physical characteristics of the passenger, such as for example the shape of the head, and/or based on specific comfort needs of the passenger. Advantageously, the rotational forward motion of the head of the pilot is thus canceled.

It is a further object of the invention to provide a system for supporting the head of a passenger of a vehicle, which is capable of ensuring the maximum freedom of movement of the head and of the upper part of the chest.

The invention achieves at least these objects by means of a system for supporting the head of an individual wearing a helmet in a vehicle, in particular in a helicopter or in an airplane which, according to claim 1, comprises
 suspension means for suspending the helmet, defining an axis X and adapted to be connected to a structure of the vehicle and to the helmet, so as to balance the loads on the musculoskeletal system of the neck of the individual, said suspension means comprising:

an arm which extends above the helmet, adapted to translate along a direction parallel to said axis X, transversal to the arm, and adapted to rotate about said axis X, an arched element provided with two end portions and connected to a first end of the arm by means of a ball joint adapted to slide along the arched element, two fixing elements adapted to be fixed to two respective side areas of the helmet, wherein each end portion of the arched element is restrained to a respective fixing element, and wherein there are provided adjustment means adapted to adjust the position of each end portion of the arched element with respect to the respective fixing element.

Advantageously, the system of the invention allows the head of the pilot—when the latter wears the helmet—to rotate and to bend sideways up to the anatomical limitations of the articulation mobility of the neck.

A further advantage of the invention is given by the fact that a support is provided which is particularly suitable for relieving the musculoskeletal system of the neck of an individual, in particular when the individual should hold their head in the horizontal position.

The suspension means are preferably connected to an inner structure of the vehicle, even more preferably to the back of a seat of the vehicle and/or to the floor of the vehicle.

The telescopic arm can be made in at least two pieces, preferably in three pieces, which are arranged one inside the other, or one on the other, and in a sliding manner for example by means of ball bearings.

Moreover, the arm can be straight or can be curved with a downward concavity. Advantageously, by making the arm curved, the limited space inside the compartment of any type of helicopter, airplane or armored vehicle is taken into account by providing a reduction of the volume.

Preferably, when the arm is telescopic, return means can be provided, for example elastic or pneumatic return means, by means of which the arm tends to close on itself without applying an external tensile force, thus reaching the smallest extension thereof possible. Such a feature is particularly advantageous in emergency circumstances. Indeed, the arm closes automatically and does not constitute an obstacle to any evacuation from the aircraft.

The telescopic arm, in particular the parts forming it, and/or the arched element can be provided with a plurality of lightening holes so as to reduce the overall weight thereof. Alternatively, the arm and/or the arched element do not have lightening holes.

Preferably, the arched element, and in particular the ball joint, is detachable from the arm.

In accordance with one aspect of the invention, the system is particularly applicable in vehicles in which the head of the passenger, which may for example be the pilot, is subject to significant accelerations during driving, possibly also vibrational, the head being further burdened by a helmet and by any further equipment such as, for example, night vision goggles or other. Such vehicles may be for example helicopters, airplanes or armored vehicles such as tanks.

Advantageously, by means of the invention, a pilot may adjust the balancing effect on the basis of the actual loads and on the basis of the distribution thereof. Such a feature is particularly advantageous when, for example, a pilot wears a helmet or a night vision goggle and later decides not to wear the vision goggle any longer, or the opposite circumstance; following the assembly, or disassembly, of the night vision goggle, the entity and distribution of the loads will vary and, by means of the invention, the balancing may be adjusted on the basis of the actual loads. A further exemplifying situation, in which the advantages of the invention may be appreciated, may be the one in which the pilot moves the night vision goggles from an operating condition to a non-operating condition, in this latter case by placing the goggle, for example, on the top of the helmet. Accordingly, the weight distribution, and therefore the center of mass of the head-helmet system, will vary.

Once again, the invention is capable of providing an adjustment capable of adapting the balancing based on the weight distribution.

A further advantage of the invention is given by the fact that a support for supporting the head is provided without making the presence of a mass at the occipital region required—although such a presence is possible—in order to obtain a reduction of the force of contraction generated by the neck muscles.

Still another advantage of the invention is given by the fact that the adjustment of the balancing can occur in an asymmetrical manner, as a function of the different morphology of the head.

Moreover, by means of the invention and in particular of the adjustment means, the effort of the pilot to counter the tendency of their head to move, particularly forward, and to maintain their head in horizontal position is significantly reduced, or even zeroed.

The adjustment means preferably comprise a guide obtained in each fixing element, which fixes the arched element to the helmet, which guide is provided with a rack.

A toothed wheel, manually operated by means of a knob and connected to the end portions of the arched element, may slide along the guide. Advantageously, by acting on the respective knob, the user may move the two end portions of the arched element independently from each other relative to the respective fixing element.

The dependent claims describe preferred embodiments of the invention, thus forming an integral part of the present description.

BRIEF DESCRIPTION OF THE DRAWINGS

Further features and advantages of the invention will be more apparent in light of the detailed description of an exemplary but non-exclusive embodiment of a system for balancing the head of an individual in a vehicle, in particular of a helicopter, shown by way of non-limiting example, with the aid of the accompanying drawings in which:

FIG. 1a and FIG. 1b show a diagrammatic side view of part of the system of the present invention, in a first and a second configuration, respectively.

The same numbers and the same reference letters in the figures identify the same elements or components.

DETAILED DESCRIPTION OF AT LEAST ONE PREFERRED EMBODIMENT OF THE INVENTION

Figure 3:
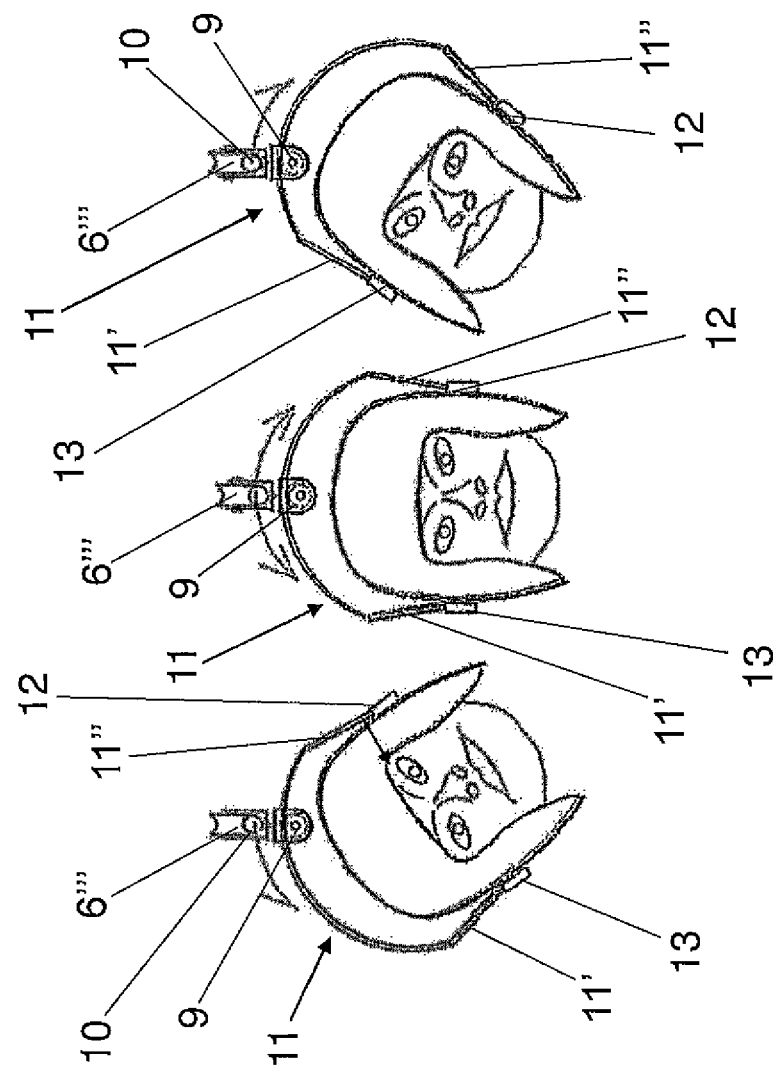
FIG. 3 shows a diagrammatic front view of some of the components of the system in FIG. 1, in a fifth, a sixth and a seventh configuration.
Figure 2:
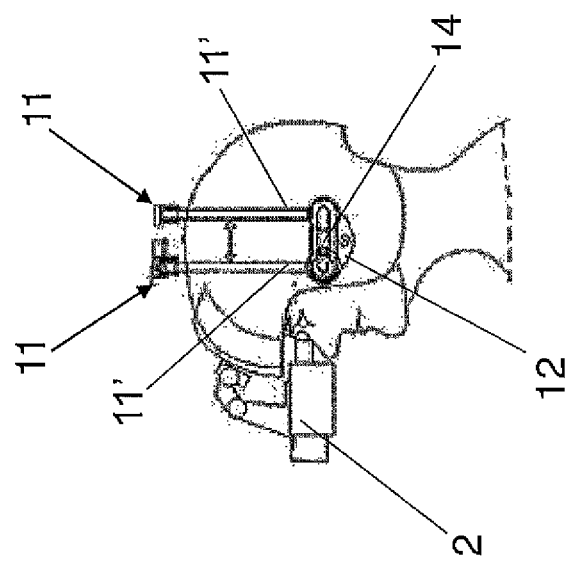
FIG. 2 shows a diagrammatic side view of a first detail of the system in accordance with FIG. 1, in a third and a fourth configuration.

In accordance with a preferred embodiment, the system of the invention is adapted to be mounted in a helicopter (not shown).

With reference to the figures, the system comprises suspension means for suspending helmet 1 provided with night vision goggle 2 and worn by an individual, for example the pilot of the helicopter.

The suspension means are adapted to be connected to the seat, or to the structure of the helicopter, and to the helmet 1, so as to balance the loads on the musculoskeletal system of the neck of the pilot.

In accordance with this embodiment, the suspension means comprise a pneumatic cylinder 3, or main cylinder, which defines a longitudinal axis X and is adapted to be fixed to the back of the seat of the helicopter by means of suitable fixing means, for example brackets. A piston 4 can slide longitudinally inside the cylinder 3. The pneumatic cylinder 3 forms part of a pneumatic system, as will be described below.

A first end of an overhanging element, or arm 6, is restrained to an end of the rod 5 of piston 4, which arm 6 extends above the head of the pilot, transversely with respect to the longitudinal axis X (see FIG. 1, for example). Arm 6 is restrained to the end of rod 5 so as to move integrally with rod 5 when the latter moves longitudinally. Moreover, the first end of arm 6 is restrained to the end of rod 5 by means of a hinge 7, so that arm 6 may rotate about the longitudinal axis X, in a plane transversal to the longitudinal axis X.

Alternatively, rod 5 is both longitudinally movable and rotatable about the longitudinal axis thereof, and the arm is fixed to the rod so as to move integrally therewith.

Arm 6 is preferably curvilinear, so as to be concave downwards, i.e. towards helmet 1.

Figure 4:
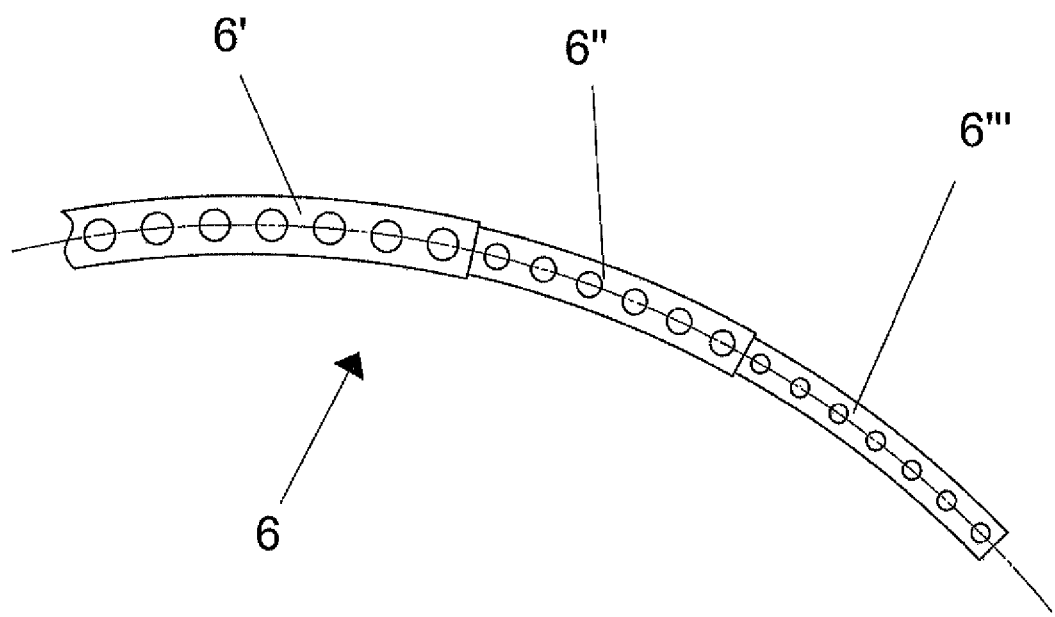
FIG. 4 shows a diagrammatic perspective view of a component of the system in FIG. 1.

Moreover, as shown in FIG. 4, arm 6 is preferably telescopic and consists of three pieces 6', 6", 6'", arranged slidingly, for example by means of ball bearings (not shown) inside one another.

In greater detail, one end of the first piece 6' of arm 6 is restrained to the end of rod 5; the second piece 6" is sliding inside the first piece 6', and the third piece 6'" is sliding inside the second piece 6".

Each piece 6', 6", 6'" of the arm 6 has a plurality of lightening holes 8 to lighten the overall weight of arm 6.

Arm 6 is provided with a return mechanism (not shown), for example a spring or a pneumatic mechanism, so that the three pieces 6', 6", 6'" of arm 6 are arranged inside one another in the resting position, that is when an external force for extending arm 6 is not applied.

A carriage 9 is hinged to the second end of arm 6, which is the end of the third piece 6'" distal from cylinder 3, by means of a ball joint 10 (see FIG. 3, for example).

Said carriage 9 is detachable from arm 6.

Alternatively, the three pieces of the telescopic arm may be sliding on one another. An arched element 11 provided with a guide (not shown) for carriage 9 is restrained to carriage 9, so that the latter may move along the arched element 11. The arched element 11 is provided with two preferably, but not necessarily, straight end portions 11', 11".

Each end portion 11', 11" is provided with a respective through hole, preferably provided with a gasket, not shown. The arched element 11 is sized so as to make it possible to fix it about helmet 2. Moreover, the arched element 11 has a plurality of lightening holes, not shown, to lighten the overall weight.

In accordance with one embodiment, two fixing elements 12, 13 are provided, for example plate-shaped fixing elements, which are adapted to be fixed to two respective side areas of helmet 1. Helmets are typically provided with holes which can be used to fix the two plates 12, 13 of the system of the invention by means of respective pins or screws.

Alternatively, the system of the invention can comprise a conveniently modified helmet, provided with areas suitable for fixing the plates 12, 13, and/or means for anchoring the arched element 11 may be provided, which are suitable for being used for conventional helmets.

The end portions 11', 11" of the arched element 11 are restrained to a respective plate 12, 13.

Advantageously, there are provided adjustment means adapted to adjust the relative position of each end portion 11', 11", and therefore of the arched element 11 with respect to the respective plate 12, 13. In particular, each plate 12, 13 is provided with a guide 14, which is substantially formed by a longitudinal opening of the plate having a larger dimension than the other two plates, and therefore defining a longitudinal axis.

The longitudinal extension of the guides 14, and therefore the length of the travel of the corresponding end portion 11', 11", may range between 30 and 70 mm, preferably it is between 40 and 60 mm.

Figure 5A:
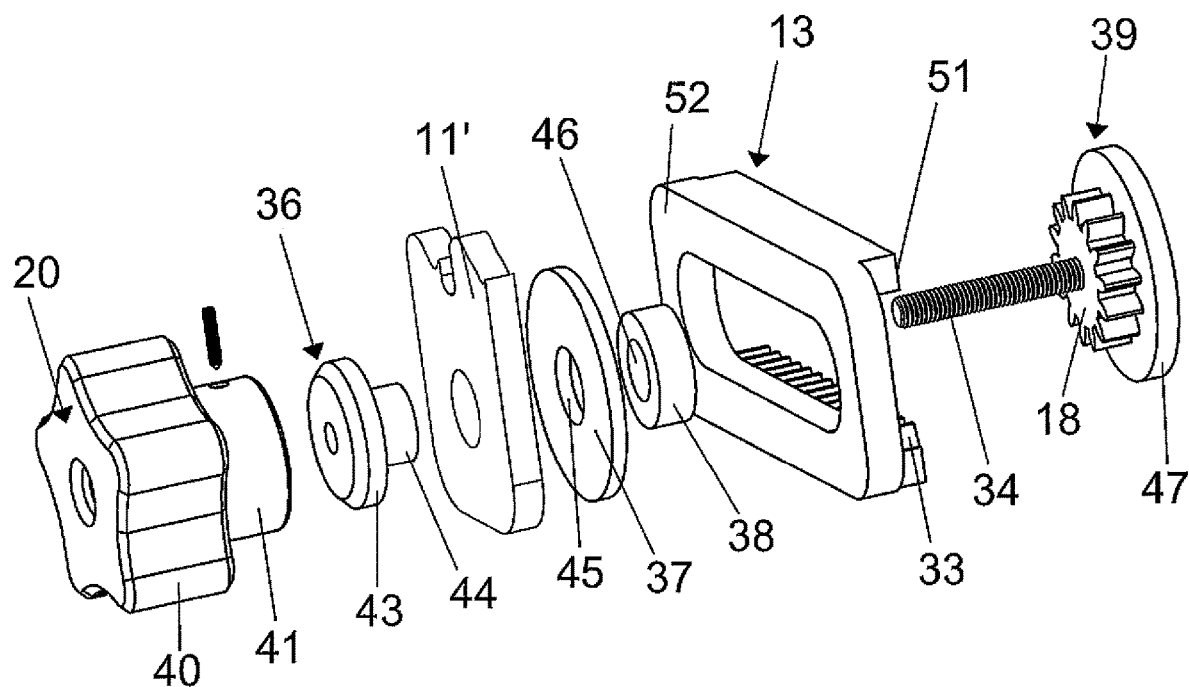
FIG. 5a shows a view of certain components of the system of the invention.
Figure 5B:
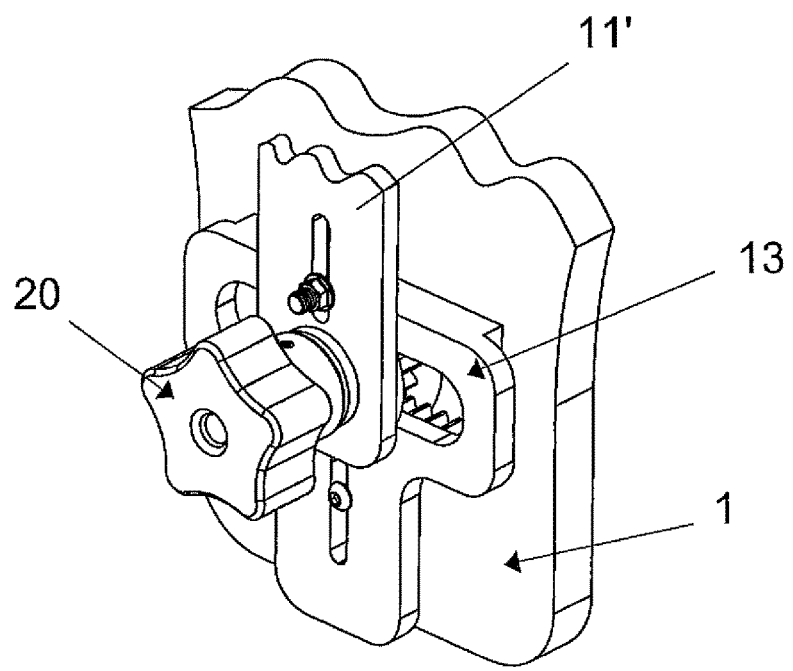
FIG. 5b shows a perspective view of a second detail of the system of the invention.
Figures 6, 6A:
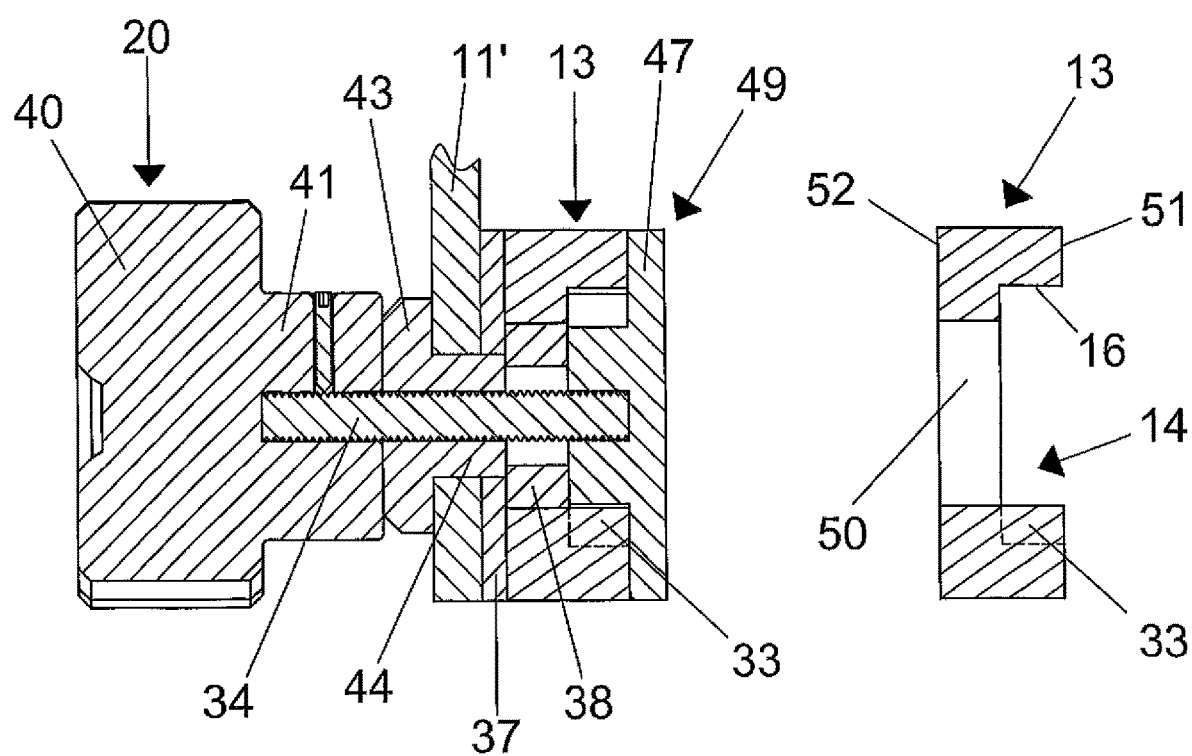
FIG. 6 shows a sectional view of certain components of the system of the invention.
FIG. 6a shows a sectional view of a component of the system of the invention.

With particular reference to FIGS. 5 and 6, a plurality of protruding teeth forming a rack 33 are provided on a first inner side of the guides 14, preferably the lower side. A second inner side 16 of the guides 14, opposite to rack 33, is substantially smooth and defines a track together with rack 33. The guides 14 are made, for example, of carbon fiber or of another suitable material.

A further inner area 50, which is lower in height than said track, is provided in plates 12, 13 (FIG. 6a) beside the track, delimited at the bottom by rack 33 and at the top by the inner side 16.

In order to fix each end portion 11', 11" to a respective guide 14 and to move each of such end portions 11', 11" along the longitudinal axis of the respective guide 14, the adjustment means preferably comprise: a knob 20, a connection element 36, a spacer 37, a washer 38, and a screw 39 (FIG. 5a).

Knob 20 is provided with a gripping portion 40 from which an attachment portion 41 coaxially extends, for example cylindrical in shape, in which a wholly threaded hole is obtained centrally.

The connection element 36 is provided with a disc-shaped portion 43 from which a cylindrical portion 44 coaxially extends. A through hole is obtained centrally and extends through the disc-shaped portion 43 and the cylindrical portion 44. The disc-shaped portion 43 and the cylindrical portion 44 have a larger and smaller outer diameter, respectively, than the inner diameter of the through hole with which each end portion 11, 11' is provided.

Spacer 37 is disc-shaped, with an outer diameter larger than the distance between the rack 33 and the side 16 of guide 14. Spacer 37 is also provided centrally with a through hole 45.

Washer 38 is disc-shaped, with an outer diameter smaller than the distance between rack 33 and side 16. Washer 38 is also provided centrally with a through hole 46.

Screw 39 is provided with a disc-shaped portion 47, with an outer diameter larger than the distance between rack 33 and side 16.

A toothed wheel 18 extends coaxially from the disc-shaped portion 47, from which toothed wheel 18 an externally threaded middle pin 34 in turn extends coaxially.

The following sequence of components is provided for each side of the helmet from the inside outwards, i.e. from an area proximal to the helmet to an area distal from the helmet. As shown in FIG. 6, the disc-shaped portion 47 of screw 39 is proximal to the helmet (not shown in FIG. 6) and is arranged so that the toothed wheel 18 engages rack 33, with the middle pin 34 arranged along an axis which is substantially perpendicular to the longitudinal axis of guide 14. The disc-shaped portion 47 is in contact with a first outer surface 51 of the plate, facing towards the helmet.

The middle pin 34 passes through washer 38, spacer 37, the end portion 11' or 11", the connection element 36, and is screwed into the threaded hole of knob 20.

Washer 38 is arranged inside the inner area 50 of plate 12, 13, between the toothed wheel 18 and spacer 37. At least one strip of rubbery material may be provided between washer 38 and the inner area 50 in order to ensure a sufficient friction between the latter elements.

Spacer 37 is arranged between a second outer surface 52 of plate 12, 13, opposite to the aforesaid first outer surface 51, and the end portion 11', 11" of the arched element 11.

The through hole 45 of spacer 37 and the through hole of the end portion 11', 11" contain the cylindrical portion 44 of the connection element 36, which in turn is crossed by the middle pin 34. The disc-shaped portion 43 of the connection element 36 is arranged in abutment on the outer side of the end portion 11', 11", with respect to the helmet. A gasket may be provided between said disc-shaped portion 43 and said outer side of the end portion 11', 11". The end portion 11', 11" may rotate with respect to the middle pin 34.

When knob 20 is rotated, the disc-shaped portion 47 rotates by sliding on the outer surface 51 of the plate, the toothed wheel 18 rotates and moves along guide 14, and accordingly the related end portion 11', 11" of the arched element 11 is moved, translating integrally with the middle pin 34 along the longitudinal axis of guide 14.

Due to the possibility of carrying out a relative movement between each plate 12, 13 and the respective end portion 11', 11" of the arched element 11, an optimal adjustment of the balancing of the loads can be obtained and the head is supported and balanced, thus minimizing the effort of the pilot to balance the position of its head. Such a relative movement between each plate 12, 13 and the respective end portion 11', 11" may vary by a few millimeters up to the whole length of the guide 14.

Moreover, the head of the pilot can be best adjusted and supported by means of the arched and rotatable telescopic arm 6, of the possibility of varying the height of the rod 5 of cylinder 3, of carriage 9 sliding along the arched element 11 and hinged to arm 6 by means of the ball joint 10, thus simultaneously providing the pilot with great freedom of movement.

Figure 7:
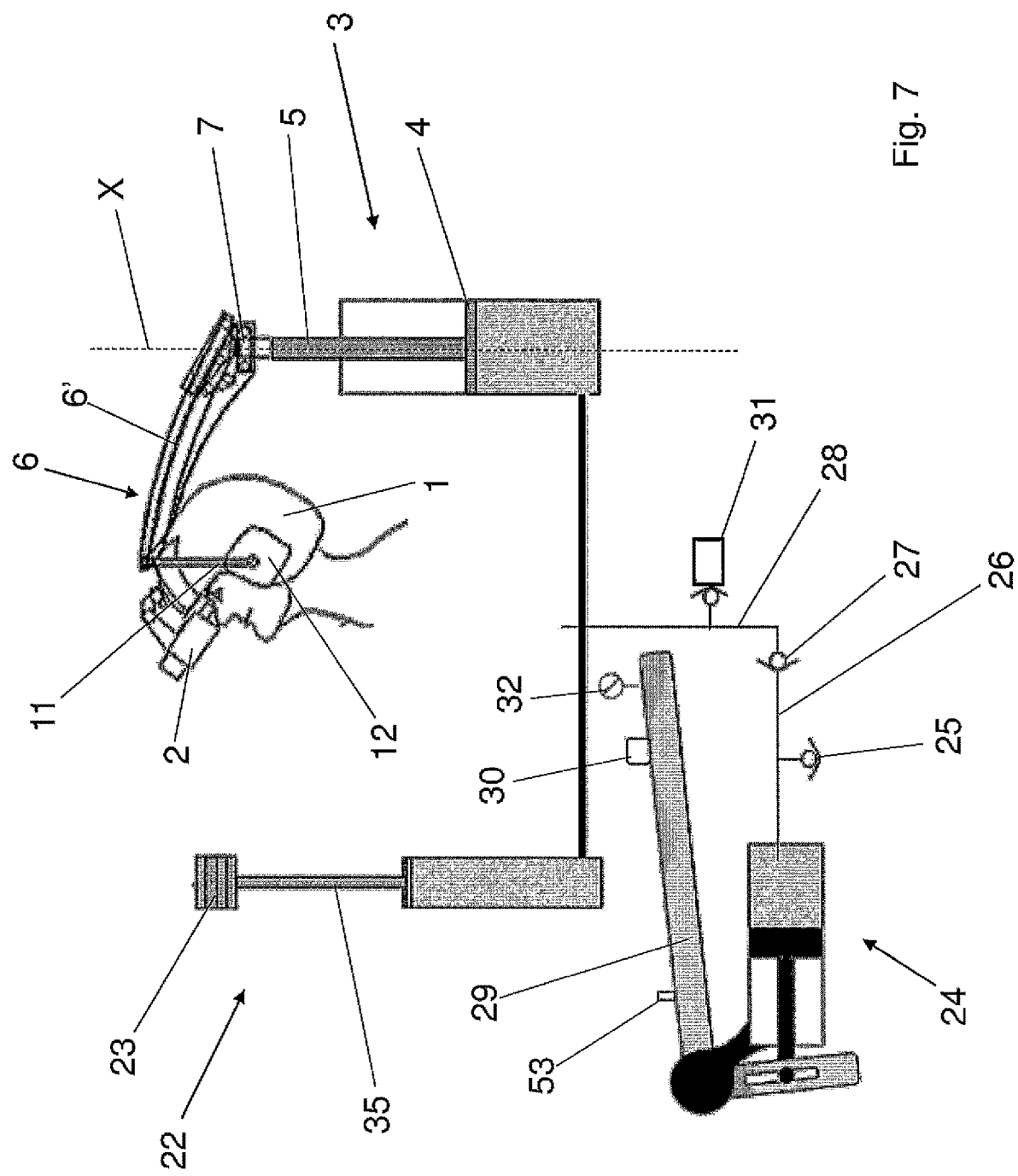
FIG. 7 diagrammatically shows the system of the invention and the related pneumatic device.

With reference to FIG. 7, the longitudinal movement of rod 5 occurs by means of a pneumatic system.

In a preferred variant, said pneumatic system comprises cylinder 3, which is called the main cylinder; a second cylinder 22, which is called the reaction cylinder; and a third cylinder 24, which is called the load cylinder.

The three cylinders are preferably pneumatically interconnected, and the pneumatic connections are achieved so as to provide a pneumatic system with a reduced volume.

Rod 35 of the reaction cylinder 22 is provided at an end thereof with a mass 23, or a gravitar mass. The reaction cylinder 22 intervenes when vertical stresses generated by the flight envelope of the helicopter, or other vehicle, take action.

Mass 23 contributes so that the system of the invention as a whole absorbs the vertical load variations without transmitting them to the pilot.

The adjustment cylinder 24, connected pneumatically to the main cylinder 3, serves to give the pilot the possibility of making an adjustment in order to adapt the system of the invention to their own comfort by adjusting the height of rod 5. The pilot may load the pneumatic circuit in complete autonomy and adjust the pressure thereof both by increasing and decreasing it, thus obtaining a fine-tuning, obtained in particular by means of the adjustment cylinder 24, which affects the balancing load perceived by the pilot, who will operate under conditions of maximum comfort. In particular, a valve 53 for adjusting the speed with which the system is loaded or unloaded may be provided on the pump lever 29.

The pneumatic system also provides two non return valves. The first non return valve 25 serves as an air intake of the adjustment circuit 26. The adjustment circuit 26 is downstream of the adjustment cylinder 24 and opens when the adjustment cylinder 24 expands. The second non return valve 27 serves as a separator between the adjustment circuit 26 and the operating circuit 28, the latter being upstream of the main cylinder 3 and downstream of the reaction cylinder 24. Valve 25 also serves to ensure that a determined initial pressure of the pneumatic system as a whole remains such. By providing two pneumatic circuits 26, 28, the volume of the adjustment cylinder 24 does not affect the efficiency of the compensation to the load factors.

When the pressure in the adjustment cylinder 24 exceeds the one of the operating circuit 28 due to the effect of the pumping action on the adjustment cylinder 24 by means of the specific pump lever 29, valve 27 opens and the air is pumped into the operating circuit 28. The same valve 25 may be voluntarily operated by the pilot by means of a specific relief button 30 for venting the adjustment circuit 26 once the wanted pressure is reached, so as to return the pump lever 29 to the resting position. Likewise, the operating circuit 28 is equipped with a relief button 31 which allows the pilot to reduce the pressure of the pneumatic circuit, as required. Moreover, a manometer 32 may also be provided, for example arranged on the same pump lever 29.

By means of the pneumatic system of the invention, not only the lifting thrust of helmet 1 can be adjusted to the stature of the pilot and their personal tastes, but also to the variations of the force of gravity G occurring during flight maneuvers and due to the effect of air turbulence. In particular, the pneumatic system of the invention allows an elastic type and dampening balancing of the load on the head of the pilot to be obtained, thus ensuring optimal conform for the pilot, also in the presence of high frequency vibrations. The system of the invention may be totally self-consistent, that is not bound by on-board systems, such as the electrical, pneumatic and hydraulic ones. Alternatively, the system of the invention may be connected to the on-board systems, for example by means of a connection to the on-board compressed air systems.

The main cylinder 3, the reaction cylinder 22 and the adjustment cylinder 24 are preferably exclusively pneumatic; since such a technical solution does not provide hydro-pneumatic cylinders, it is particularly advantageous if used in aircraft.

All the cylinders are interconnected pneumatically and therefore the identification of the individual cylinders is a repetitive process, in which the variation of one of the magnitudes involved results in the chain variation of the others. In some cases, there is also the need to identify the best compromise, such as for example in the choice of the reaction cylinder: the more the diameter of the cylinder decreases, the more the gravitar mass required decreases, but the stroke of the cylinder required increases accordingly to cause the required variation in pressure.

The main cylinder 3 preferably has an inner diameter ranging between 16 and 25 mm, for example equal to about 16 mm, and a stroke ranging between 25 and 100 mm, for example equal to about 50 mm; the reaction cylinder 22 preferably has a diameter ranging between 8 and 25 mm, for example equal to about 8 mm, and a stroke ranging between 100 and 300 mm, for example equal to about 200 mm; and the load cylinder 24 preferably has a diameter ranging between 8 and 25 mm, for example equal to about 8 mm, and a stroke ranging between 10 and 40 mm, for example equal to about 15 mm. Such values may be varied according to the needs. In particular, the stroke of the main cylinder may be varied to allow an adjustment based on the height of the pilot up to e.g., ±150 mm.

The adjustment cylinder 24 is preferably capable of increasing the pressure of the adjustment circuit 26 when the reaction cylinder 22 is resting, that is entirely extended, up to about 2.6 bar, thus further relieving the load to which the pilot is subjected.

Advantageously, the substantially vertical translation of rod 5, and therefore of arm 6 connected thereto, occurs in a pneumatic manner.

The suspension means are adapted to impart an upward push on helmet 1 which, accordingly, develops a balancing force of the weight of helmet 1 and/or of any equipment associated therewith, such as the night vision goggles 2.

In other words, the system of the invention acts as a crane with regards to helmet 1, which serves the purpose of lightening the weight of the helmet and of any further equipment supported by the neck musculature. Moreover, the system of the invention does not interfere with the natural movements of the head. For example, by means of the system of the invention, the head of the passenger may tilt to the right or to the left according to a rolling movement and perform roto-translational motions with respect to hinge 7, consisting of rotations and tilting to the right and to the left.

In brief, the system allows all the movements required for the work of a helicopter pilot and, when conveniently adapted, compensates for any use of equipment associated with the helmet or in any case with the head of the passenger in addition to the weight of the head itself.

It is worth noting that this embodiment has been described by way of non-limiting example only. In particular, although it is highly advantageous, the pneumatic system is not a required feature of the present invention. Rod 5 may be moved longitudinally also in a different manner, for example by means of a different pneumatic system or by means of exclusively mechanical means, without departing from the scope of the present invention. Moreover, various and equivalent adjustment means may be used for the relative movement between the arched element and the fixing elements to the helmet.

The invention claimed is:

1. A system for supporting a head of an individual wearing a helmet in a vehicle, in particular in a helicopter or in an airplane, the system comprising:
    suspension means for suspending the helmet, defining an axis and adapted to be connected to a structure of the vehicle and to the helmet, so as to balance loads on a musculoskeletal system of a neck of the individual, said suspension means comprising:
        an arm which extends above the helmet, adapted to translate along a direction parallel to said axis, transversal to the arm, and adapted to rotate about said axis,
        an arched element provided with two end portions and connected to a first end of the arm by means of a ball joint adapted to slide along the arched element,
        two fixing elements adapted to be fixed to two respective side areas of the helmet,
    wherein each end portion of the arched element is restrained to a respective fixing element,
    and wherein there are provided adjustment means adapted to adjust a position of each end portion of the arched element with respect to the respective fixing element.

2. A The system according to claim 1, wherein the adjustment means comprises:
    a guide provided on each fixing element and
    a corresponding movable element, adapted to be moved along the respective guide,
    and wherein each end portion is restrained to a respective movable element.

3. The system according to claim 2, wherein the guide is a rack guide and the movable element is a toothed wheel provided with an adjustment knob for adjusting a position thereof along the rack guide.

4. The system according to claim 1, wherein the arm is curvilinear and telescopic.

5. The system according to claim 4, wherein the arm comprises return means whereby the arm tends to close on itself without applying an external force.

6. The system according to claim 1, wherein said suspension means further comprise a first pneumatic cylinder adapted to control a translation of the arm.

7. The system according to claim 6, wherein a second end of the arm is rotatably restrained to a rod of a piston of said first pneumatic cylinder.

8. The system according to claim 6, wherein said suspension means further comprises a second pneumatic cylinder and a third pneumatic cylinder, wherein the first, second and third pneumatic cylinders are pneumatically interconnected to one another thus defining at least one pneumatic circuit, and wherein the second pneumatic cylinder is adapted to obtain a better adjustment of a pressure inside the pneumatic circuit, and the third pneumatic cylinder is adapted to charge the pneumatic circuit.

9. The system according to claim 7, wherein said suspension means further comprises a second pneumatic cylinder and a third pneumatic cylinder, wherein the first, second and third pneumatic cylinders are pneumatically interconnected to one another thus defining at least one pneumatic circuit, and wherein the second pneumatic cylinder is adapted to obtain a better adjustment of a pressure inside the pneumatic circuit, and the third pneumatic cylinder is adapted to charge the pneumatic circuit.

\* \* \* \* \*